Figure 4:
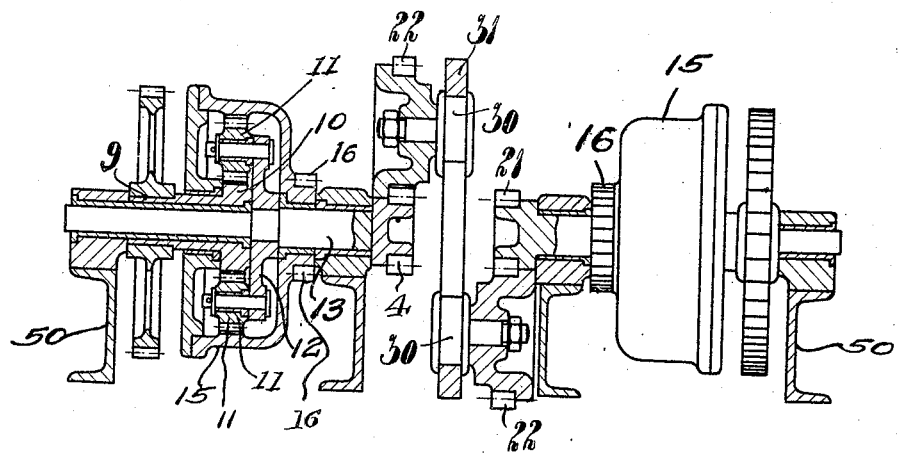

Feb. 23, 1926.
F. A. NILSSON
1,574,679
SUPPORTING AND PROPELLING MECHANISM FOR MOTOR VEHICLES
Filed March 24, 1922      9 Sheets-Sheet 1
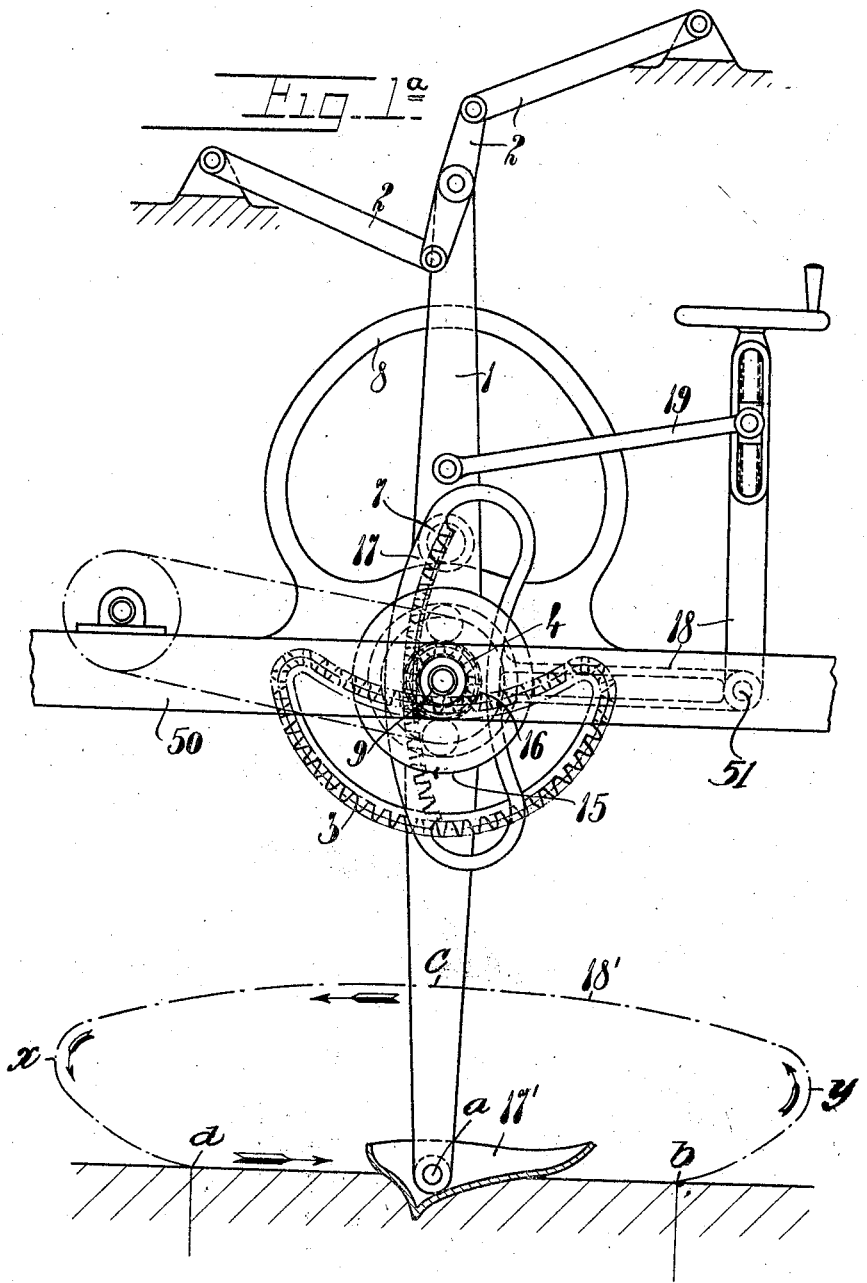

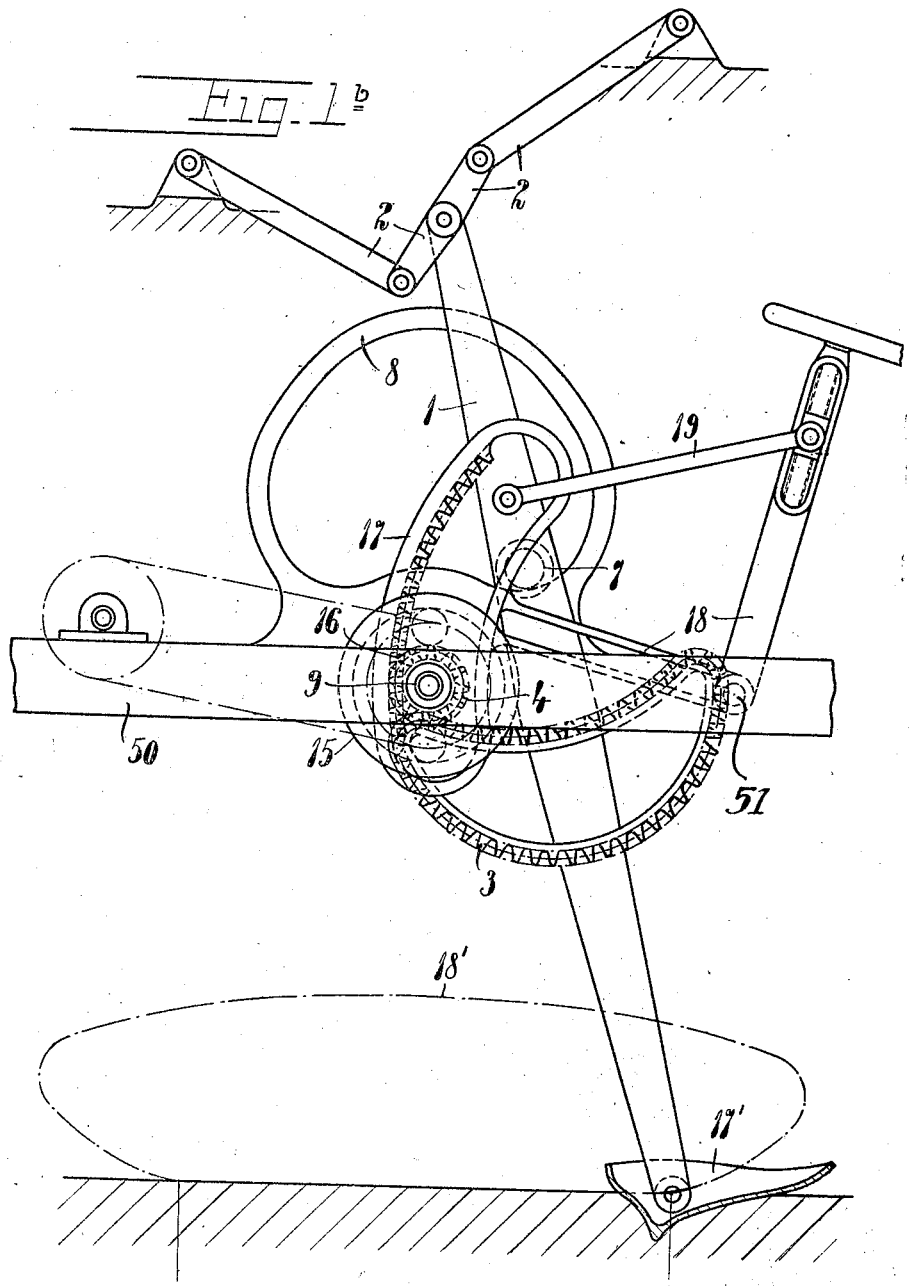

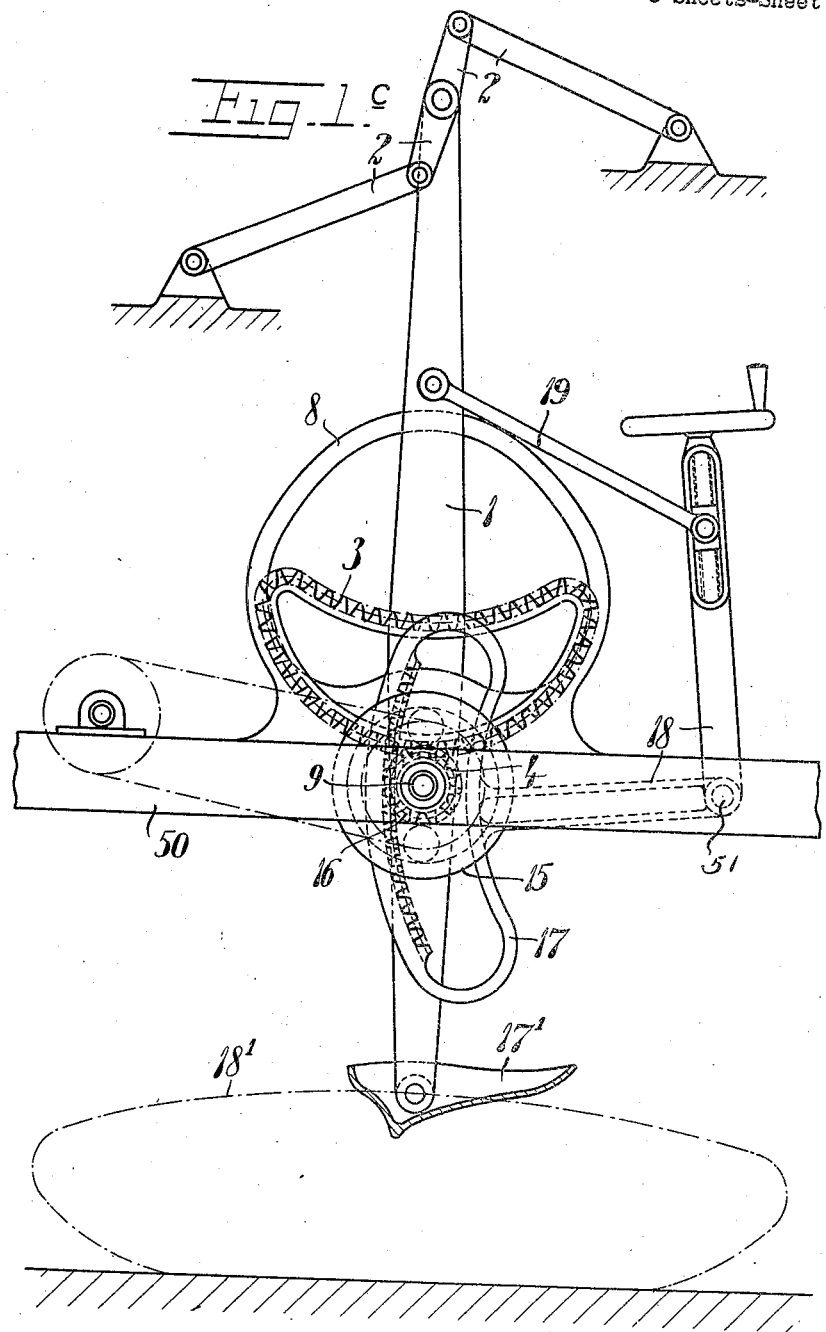

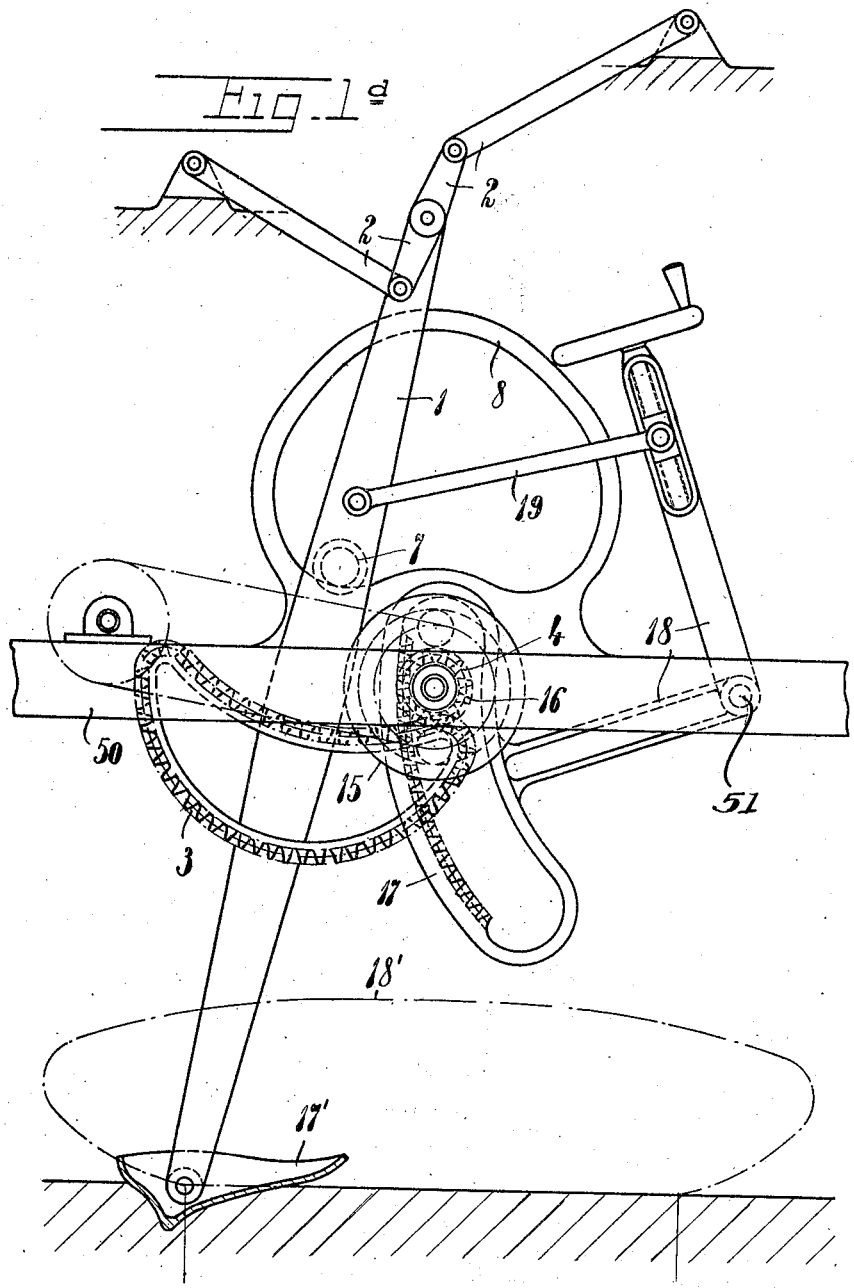

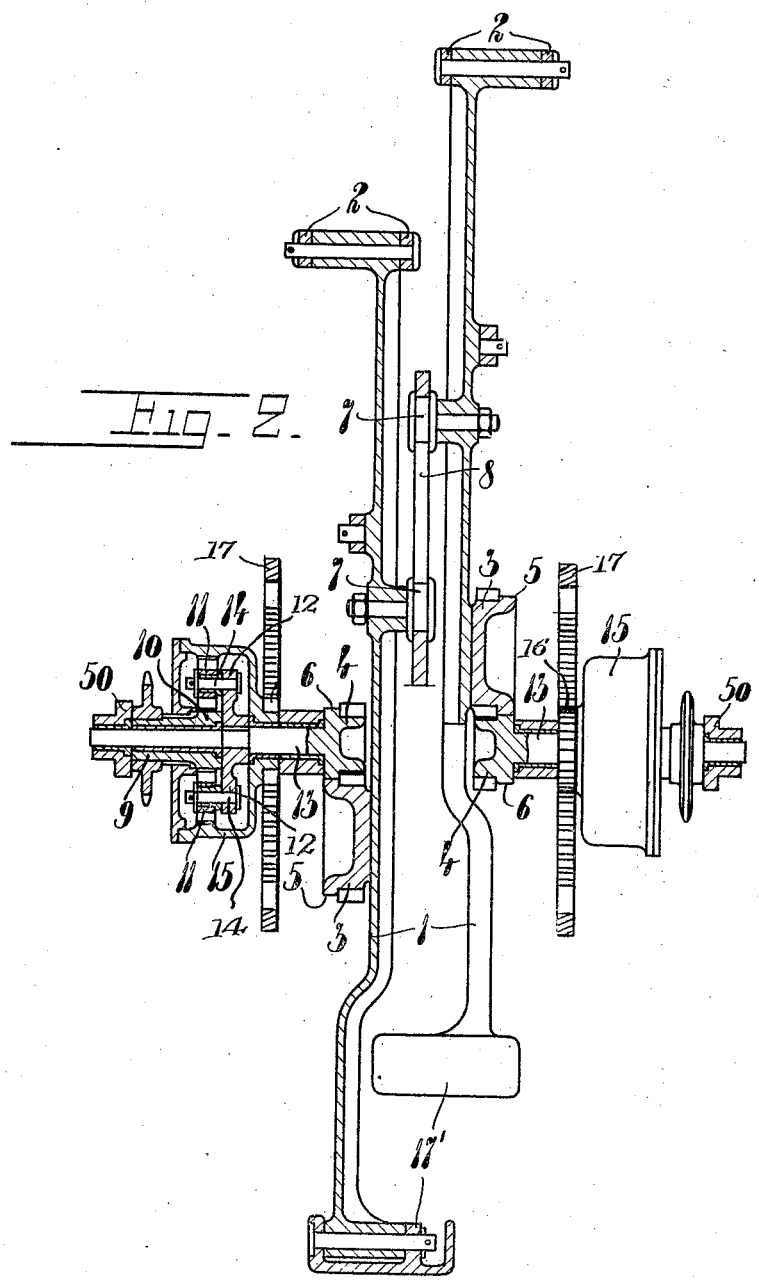

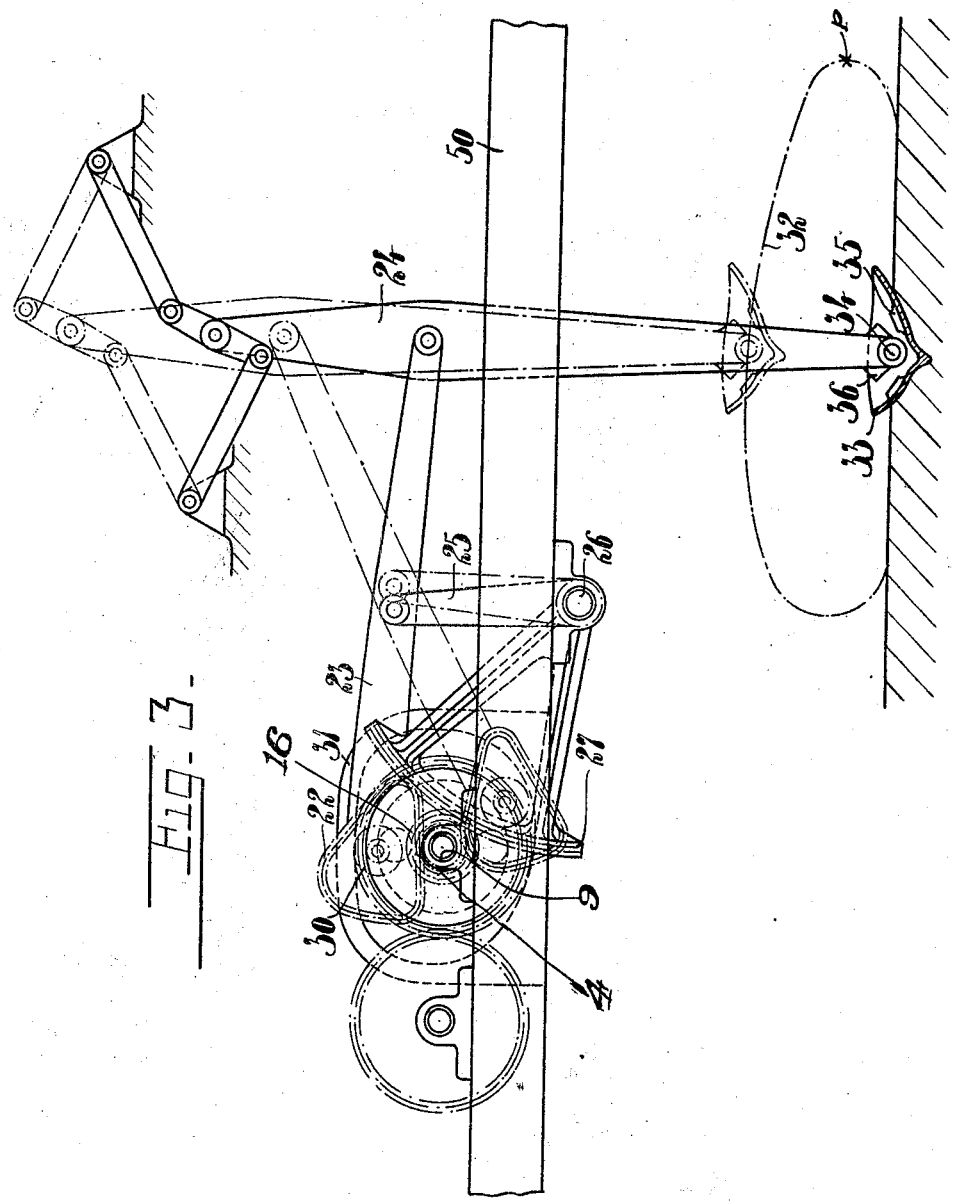

Feb. 23, 1926.
F. A. NILSSON
1,574,679
SUPPORTING AND PROPELLING MECHANISM FOR MOTOR VEHICLES
Filed March 24, 1922
9 Sheets-Sheet 7

Inventor
Fritz Albert Nilsson
by James Sheehy, Atty.

Feb. 23, 1926.
F. A. NILSSON
1,574,679
SUPPORTING AND PROPELLING MECHANISM FOR MOTOR VEHICLES
Filed March 24, 1922
9 Sheets-Sheet 8
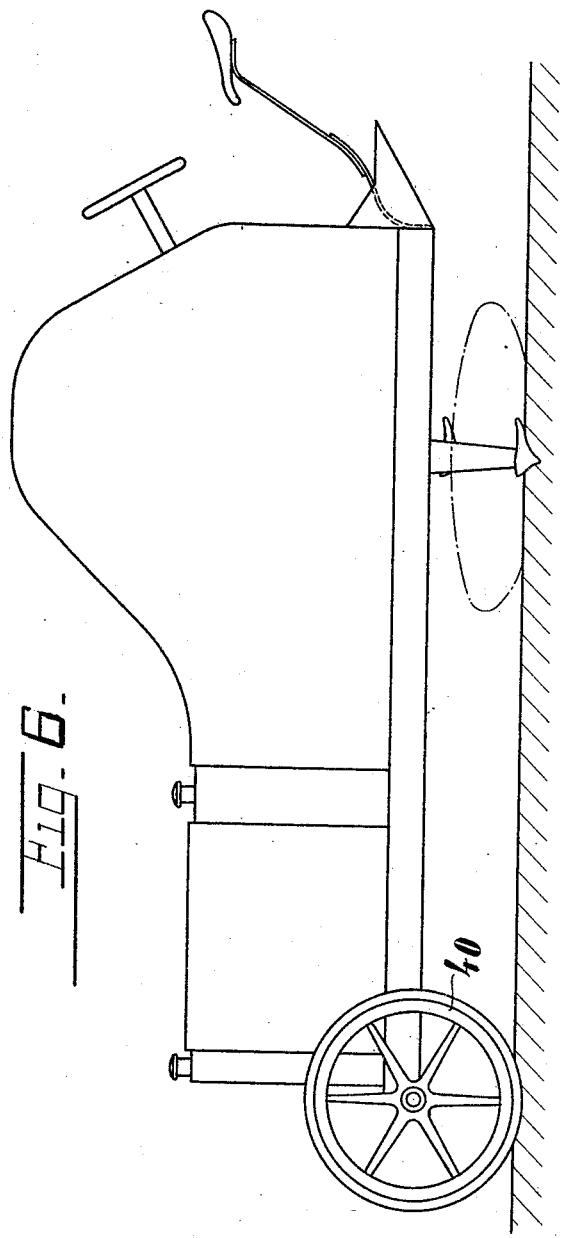

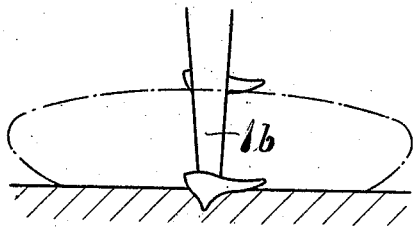
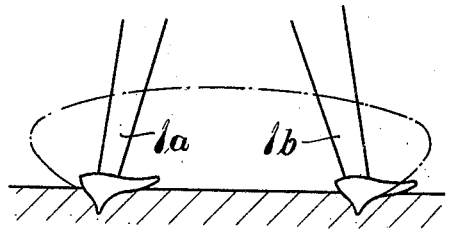
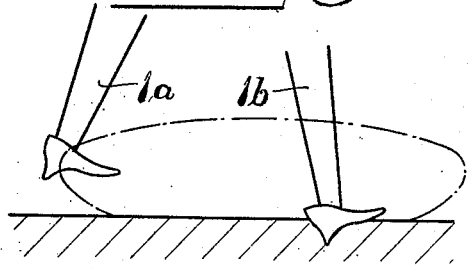
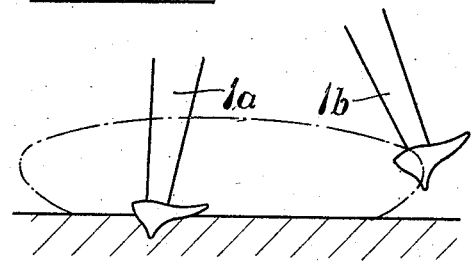
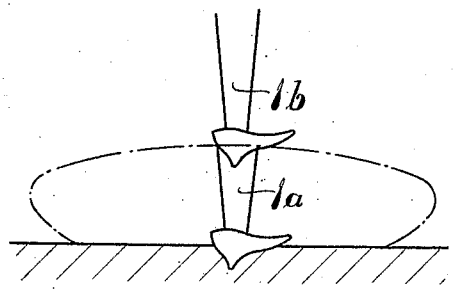

Patented Feb. 23, 1926.

1,574,679

UNITED STATES PATENT OFFICE.

FRITZ ALBERT NILSSON, OF KARLSKOGA, SWEDEN.

SUPPORTING AND PROPELLING MECHANISM FOR MOTOR VEHICLES.

Application filed March 24, 1922. Serial No. 546,503.

*To all whom it may concern:*

Be it known that I, FRITZ ALBERT NILSSON, a citizen of the Kingdom of Sweden, residing at Karlskoga, Sweden, have invented new and useful Supporting and Propelling Mechanism for Motor Vehicles, of which the following is a specification.

My invention relates to motor vehicles and has for its object to provide a supporting and propelling mechanism for motor vehicles, and more especially for motor plows and traction engines which comprises a plurality of legs and feet that are caused to move in a manner like those of a horse.

The object of this invention is to provide an improved mechanism of this kind in which a uniform speed of travel of the vehicle may be obtained by two legs only.

A feature of this invention consists in the provision of means for imparting such a movement to the legs that the feet thereon are caused to move on a somewhat straight line and at a low speed during their working stroke, that is, when they are in contact with the ground, but are caused to move at a higher speed in their return stroke, that is, when they are out of contact with the ground.

Another feature of the invention involves means for imparting such a movement as to cause the feet thereof to move at an approximately constant speed during said working stroke and at a successively accelerated speed along the first half portion of the return stroke, and at a successively retarded speed during the last half portion of said return stroke.

These and other features of the invention will clearly appear from the following description, reference being had to the drawing in which several embodiments of the invention are illustrated.

Figure 5:
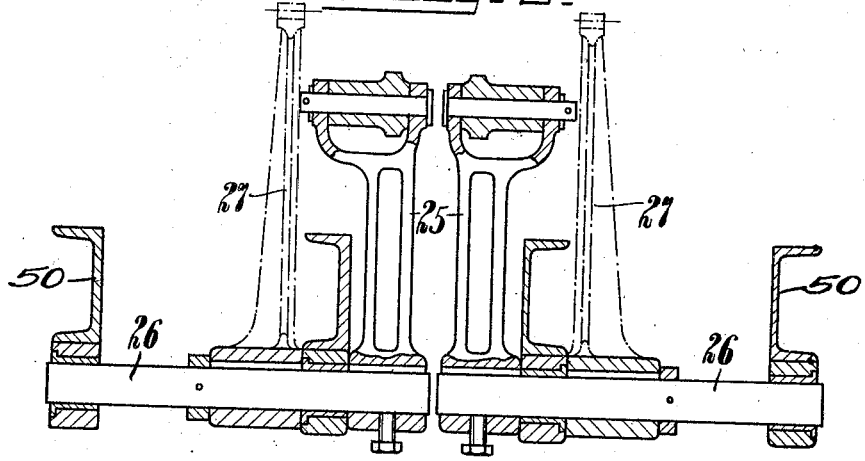

Fig. 1ª is a side elevation, with part in section, of a leg with its operating means. Fig. 1ᵇ is a similar view showing the relative position of the parts when the foot is at the point *b* in Fig. 1ª. Fig. 1ᶜ is a similar view showing the relative position of the parts with the foot at the point *c* in Fig. 1ª, and Fig. 1ᵈ is a similar view showing the position of the parts with the foot at the point *d* in Fig. 1ª. Fig. 2 is a vertical section of a pair of legs with their operating mechanisms. Figs. 3, 4, 5, illustrate another embodiment of the entire supporting and propelling mechanism.

Fig. 3 is a side elevation of said mechanism with part in section. Fig. 4 is a cross section, with parts in elevation, of the means for reciprocating a pair of legs. Fig. 5 is another cross section of said means. Fig. 6 shows the outlines of a traction engine constructed according to the present invention with two steering wheels provided at its front end and a pair of legs near its rear end. Figs. 7–11, inclusive, illustrate different relative positions of two cooperating legs during half a cycle of operation thereof.

With reference to the embodiment shown in Figs. 1ª, 1ᵇ, 1ᶜ, 1ᵈ and 2 the numeral 1 indicates one of a pair of legs which are identical so that it is sufficient to describe and illustrate one of them only. The leg 1 is connected at its upper end to a system of links 2 mounted so as to form a substantially vertical guide for said upper end of the leg 1. Rigidly attached to the leg nearly midway between the ends thereof is a concavo-convex cam 3 with the convex portion directed downwardly. The cam 3 is formed with external teeth. Meshing constantly in said teeth is a pinion 4 rotatably mounted in the rigid frame 50 of the vehicle. The toothed cam 3 as well as the pinion 4 are formed with cooperating smooth contact surfaces 5 and 6, respectively, along with the teeth, said contact surfaces corresponding to the pitch circles of the cam 3 and the pinion 4, respectively. This enables the pinion 4 to be pressed with great power against the toothed cam 3 without causing its teeth to descend to the bottom of the tooth-spaces in the cam. Carried by the leg 1 above the cam 3 is a roller 7. Said roller engages the curve-shaped inner wall of a cam disk 8 rigidly attached to the frame 50 of the vehicle.

The pinion 4 receives driving power from a motor, not shown, by means that will be now described. A tubular shaft 9 (Fig. 2), which is connected to the motor to be driven therefrom at a constant speed carries a pinion 10 forming the sun wheel of a sun and planet wheel gear the planet wheels 11 of which are mounted on two journals 14 rigidly connected to the pinion 4 by means of a yoke 12 and a shaft 13. The planet wheels 11 are also in mesh with teeth formed on the inner surface of a casing 15 mounted to rotate easily on the shaft 13. Said casing 15 is also formed with an external toothed rim 16 adapted to be engaged by an internally toothed segment 17 carried by an angularly shaped lever 18 pivoted to the frame 50 at 51 and connected to the leg 1 by means of a link 19 (Fig. 2).

The operation of the above described supporting and propelling means is as follows: Let it be assumed that the driving shaft 9 is rotated in counterclockwise direction (Fig. 1ª). The sun wheel 10 attached to the shaft 9 rotates the planet wheels 11. The planet wheels 11, in turn, will tend to rotate the casing 15 due to their engagement in the internal teeth thereof. As the casing 15 cannot rotate freely because of the engagement between its teeth 16 and the toothed segment 17, the planet wheels 11 are caused to roll upon the internal toothed rim of the casing 15 and will thus cause the yoke 12 together with the shaft 13 and the pinion 4 to rotate in counterclockwise direction. The pinion 4 which is now in engagement with the upper concave portion of the toothed cam 3 tends to move said cam to the right in Fig. 1ª. As the cam 3 is rigidly attached to the leg 1 there will, thus, also be a tendency to move the leg 1 to the right. Owing, however, to the engagement of the foot 17' in the ground, said tendency will result in a movement of the pinion 4 and the vehicle to the left. Due to the concave shape of the upper portion of the cam 3, the frame with the mechanism may move horizontally while maintaining the engagement between the foot 17' and the ground, inasmuch as the distance between the pinion 4 and the foot 17' will successively grow longer according as the pinion approaches the left end of the cam, as is readily understood by an inspection of Figs. 1ª and 1ᵇ.

With the pinion 4 at the said left end of the cam 3 the position of the parts will be that shown in Fig. 1ᵇ. From said figure it will also be seen that the toothed segment 17 due to its connection with the leg 1 has moved upwardly from its intermediate position shown in Fig. 1ª. This movement has caused a rotation of the toothed rim 16 and the casing 15 in clockwise direction. In the operation described the planet wheels 11 were rotating the yoke 12 and the pinion 4 in counterclockwise direction. Due to the rotation of the casing in clockwise direction the speed of rotation of the yoke with the pinion is slow relatively to the speed that would have been obtained if the casing had been at rest. As the speed of rotation of the pinion is slow the propelling of the vehicle as above described will be accordingly slow. The design of the mechanism is such that the rotation of the pinion 4 will be substantially constant during the period, during which the leg is in engagement with the ground.

When the position shown in Fig. 1ᵇ is reached and the pinion 4 moves around the left end of cam 3 the pinion will allow the cam to move upwardly under the control of the roller 7 and guide-way 8, so that the leg is lifted and its foot 17' removed from the ground. When the pinion comes into engagement with the lower convex portion of said cam, the pinion 4 will move the cam 3 together with the leg 1 and the released foot to the left. Owing to the convex shape of the cam portion now engaged by the pinion 4, the cam 3 together with the leg will at the same time positively lift the cam to still more lift the leg and its foot. The leg 1, when moving to the left, will cause the link 19 to turn the toothed segment 17 downwardly. This effects a counterclockwise rotation of the toothed rim 16 and the casing 15. With the casing 15 rotating counterclockwise, that is, in the same direction as the driving shaft 9, the planet wheels 11 will move the yoke 12 and the pinion 4 at a high speed relatively to the speed obtained when the casing 15 is at rest and at a still higher speed relatively to the speed obtained when the casing 15 is rotating in clockwise direction, as hereinbefore described. The said higher speed of rotation of the pinion 4 results in a correspondingly increased speed of the cam 3 and the leg 1. It is easy to see that owing to the convex shape of the under portion of the cam 3, the horizontal length that the cam 3 and the leg 1 are moved for each revolution of the pinion 4 will be the greater according as the pinion approaches the lowermost or central point of said convex portion. The speed of the movement of the leg will thus be successively increased according as the leg approaches the position shown in Fig. 1ᶜ and will be highest when the leg reaches said last mentioned position. In this position the leg is in its uppermost position, as shown. The toothed segment 17 is in this case in its intermediate position relatively to the toothed rim 16 engaged thereby.

The pinion 4 in its continued rotation from said position will still move the cam 3 together with the leg 1 forward. In this continued movement, however, the cam 3 will be allowed to descend successively, as is easily understood from the drawing. The toothed segment 17 is still turned downwardly with the said higher speed and the pinion 4 is thus still rotating at the high speed as above described. Owing, however, to the fact that the pinion 4 will now come into engagement with the more and more inclined right hand half of the convex portion of the cam 3, the horizontal length of movement imparted to the cam and the leg by the pinion at each revolution of the latter will be successively decreased.

When the pinion 4 passes the right end of the cam 3 the direction of movement of the cam 3 together with the leg 1 is again reversed and the direction of movement of the segment 17 is likewise reversed so as to reverse the rotation of the casing 15 in order to decrease the speed of the pinion 4 in the manner already described.

The operation of the mechanism from the position shown in Fig. 1$^d$ to the position shown in Fig. 1$^a$ is similar to the operation of said mechanism from the position Fig. 1$^a$ to the position Fig. 1$^b$ and need not be described in detail.

The operation of the roller 7 is to secure a constant operative engagement between the pinion 4 and the cam 3, the shape of the guide-way 8 for said roller to this end being such as to cause the leg to always maintain the cam 3 in engagement with said pinion.

The path described by the foot 17' in the cycle above described is indicated by 18' in the drawing.

From the above description it is clear that the leg itself controls the ratio of gearing of the sun and planet wheel gear by means of link 19, lever 18, toothed segment 17 and toothed rim 16.

By means of a single pair of alternately operating mechanisms of the described design together with their legs a vehicle may be propelled effectively at a uniform speed.

In Figs. 7–11 successive relative positions of two such legs during half a cycle of operation thereof are shown. In said figures the legs are indicated by 1$^a$ and 1$^b$, respectively.

In Figs. 3–5 I have shown a modified form of the operating mechanism for one of a pair of legs. In this construction the leg 24 is guided vertically at its upper end, in the same way as described in connection with the embodiment already described. At its lower end the leg 24 carries a foot 33 which is pivoted to the leg at 34 to rotate relatively thereto. To limit the said relative rotation of the foot the foot is provided with abutments 35 to cooperate with abutments 36 on the leg. This arrangement is for the purpose of securing the most effective engagement of the foot in the ground.

The operating mechanism for one leg includes as before the tubular driving shaft 9 mounted on the frame 50 of the vehicle and driven in any appropriate way from the driving motor (not shown), a sun wheel 10 on the shaft 9, planet wheels 11 engaged by said sun wheel and engaging, in turn, internal teeth of a casing 15, and a disk 12 carrying said planet wheels and rigidly connected through the shaft 13 to a pinion 4. The casing 15 is formed as before with external teeth 16. The pinion 4 in this case engages an externally toothed cam 22 carried by a lever 23 pivoted to the leg 24.

The teeth 16 of the casing 15 are engaged by a toothed segment 27 mounted in the frame 50 at 26. Said segment 27 is rigidly connected to a lever 25 also mounted at 26 and pivoted at its other end to the lever 23. Rigidly mounted on the frame 50 is a stationary cam 31 having a cam shaped opening engaged by a roller 30 mounted on a stud carried by the toothed cam 22 as shown in Fig. 3.

The operation of this mechanism is as follows as seen from the position shown in Fig. 3: The driving shaft 9, when driven, is moving in clockwise direction. The shaft 9, in operation, rotates the sun wheel 10 which in turn tends to rotate the planet wheels 11 in counterclockwise direction. The planet wheels 11 due to their engagement in the internal teeth of the casing 15 are caused to roll upon said teeth because of the fact that the casing 15 cannot rotate freely. The planet wheels 11 in said rolling causes the disc 12 together with the shaft 13 and the pinion 4 to rotate clockwise. The pinion 4 which engages the lower straight portion of the cam 22, causes the cam 22 to move to the right relatively to the pinion 4 (Fig. 3). The cam 22 and its supporting arm 23, however, cannot move to the right due to the connection of the arm 23 to the leg 24 which is prevented from moving to the right because of its engagement in the ground. The result of the operation of the cam 22 by the pinion 4 will thus be a rolling of the pinion 4 on the cam 22 to the left. As the pinion cannot move to the left relatively to the vehicle frame the vehicle frame is propelled accordingly to the left. The upper point of the leg 24 moves with the frame as its guiding link system is carried by the frame. In other words, the leg 24 will swing to the left with its upper end while maintaining the engagement of the foot 33 in the ground. The shaft 26 is also moved to the left by the frame. This means that the lever arm 25 will successively turn to the right around the axis of the shaft 26. As the lever arm 25 is rigidly connected to the toothed segment 27 the latter is caused to successively turn upwardly. The segment 27, in turn, rotates the toothed rim 16 together with the casing 15 in counterclockwise direction. The casing 15, when rotating in counterclockwise direction, decreases the speed of the movement of the planet wheels 11 together with the disc 12 and the pinion 4 in clockwise direction as explained hereinbefore.

In the above described operation, that is with the leg 24 propelling the frame to the left the speed of rotation of the pinion 4 will thus be very slow. The speed of travel of the frame is accordingly slow.

When the pinion 4 reaches the lower left end of the cam 22, the latter is moved downwardly by the pinion thereby causing the supporting lever 23 to swing about its connection with the lever arm 25 so as to lift the leg to release the foot 33 from its engagement in the ground. The segment 27 is still turning upwardly, inasmuch as the leg 24 continues to swing in the same direction as before because its lower end is moved to the right. This continues till the pinion 4 reaches the extreme left middle point of the left hand portion of the cam 22. When this point is reached the segment 27 has reached its uppermost position and the foot 33 is now at the point $p$ (Fig. 3).

In the continued rotation of the pinion 4, while being still in engagement with the said left portion of the cam 22, the latter is still moved downwardly. In this movement the leg is successively returned to an upright position inasmuch as its lower end is now moved to the left and at the same time lifted. Due hereto the lever arm 25 is turned to the left and commences to rotate the toothed segment 27 downwardly. The toothed segment, in turning downwardly, rotates the toothed rim 16 with the casing 15 in clockwise direction. The casing 15 is thus now rotating in the same direction as the sun wheel 10 of the sun and planet wheel gear thereby causing the planet wheels 11 with the yoke 12 and the pinion 4 to rotate more rapidly than would be the case if the casing 15 were held stationary and still more rapid relatively to the speed of rotation obtained with the casing rotating counterclockwise, as above described.

This rapid rotation of the pinion 4 results in a correspondingly rapid movement of the cam 22 together with the leg to the left. This rapid rotation continues until the pinion 4 reaches the right end of the cam 22, whereupon the direction of swinging of the leg and thus also the direction of rotation of the casing 15 is again reversed thereby again giving the pinion 4 a reduced speed of rotation in the way already described.

The means for reciprocating the legs are so constructed that the tractor may travel in both directions. The reversal of the direction of travel of the tractor may be obtained by reversing the direction of movement of the driving motor or by introducing an intermediate wheel in the transmission between the motor and the legs.

With the constructions described two legs are sufficient to give the vehicle an even propelling movement the legs being alternately moved to and fro. In such case the difference in speed during the operative and inoperative stroke of each leg may be such as to secure that, as shown in Figs. 10–14, either of the two legs will always be in contact with the ground so that as regards the supporting and propelling effect, two legs will correspond to a traction wheel. As shown in Fig. 2, the feet of the legs are so shaped that their inner edges will extend laterally one over the other with the result that the width of the path on which the legs may walk will be sufficiently small to allow both of the legs to travel in a common furrow or the like. For steering purposes one or more steering wheels may be provided, as shown at 40 in Fig. 6.

What I claim is:—

1. A supporting and propelling mechanism for motor vehicles, comprising a frame, legs having feet thereon to support said frame, means for causing said legs to move with their feet rearwardly relative to the frame along a substantially straight line with the feet in contact with the ground, to lift the legs at the end of said movement and move same so as to cause the feet thereof to describe a curved path having rounded off edges and an extended convex top, and means controlled by the legs themselves to cause the legs to move with their feet at an approximately constant speed during said rearward movement and to cause the legs to move with their feet at a successively accelerated speed along the first half portion of said curved path and at a successively retarded speed during the last half portion of said curved path and said means being further so constructed that the time required for each foot to move along said curved path is substantially equal to the time required for the foot to move along said straight line.

2. A supporting and propelling mechanism for motor vehicles, comprising a frame, a plurality of legs having feet thereon for supporting said frame, means comprising a successively variable speed gearing for each leg, for causing said legs to move with their feet rearwardly relative to the frame along a substantially straight line, to lift the legs at the end of said movement and move same in a curved path, and means controlled by the leg for adjusting said variable speed gearing to change the speed of the reciprocating movement of the legs during each cycle of operation thereof so as to cause the legs to move with the feet at an approximately constant speed during said rearward movement and to cause the legs to move with the feet at a successively accelerated speed during the first half of said curved path movement and at a successively retarded speed during the last half of said curved path movement.

3. A supporting and propelling mechanism for motor vehicles, comprising a frame, a plurality of legs having feet thereon for supporting said frame, means for reciprocating said legs, said means comprising for each leg a sun and planet wheel gear, and means controlled by the leg for varying the ratio of gearing of said sun and planet wheel gear during the cycle of operation of the leg.

4. A supporting and propelling mechanism for motor vehicles, comprising a frame, a plurality of legs having feet thereon for supporting said frame, means for reciprocating said legs, said means comprising for each leg a sun and planet wheel gear, a toothed cam attached to the leg, a pinion mounted in said frame and engaging in said cam, means rigidly connected to said pinion for supporting the planet wheels of said sun and planet wheel gear, a rotatably mounted toothed rim engaged by said planet wheels, and means controlled by the leg to turn said toothed rim to and fro to successively increase and decrease the ratio of gearing of the sun and planet wheel gear during each cycle of operation of the leg.

5. A supporting and propelling mechanism for motor vehicles, comprising a frame, a plurality of legs having feet thereon for supporting said frame, means for reciprocating said legs and thereby propelling the frame, said means comprising for each leg a sun and planet wheel gear, a toothed cam attached to the leg, a pinion mounted in said frame and engaging in said cam, means rigidly connected to said pinion for supporting the planet wheels of said sun and planet wheel gear, a rotatably mounted toothed rim engaged by said planet wheels, another toothed rim rigidly connected to said first-mentioned toothed rim, a toothed segment engaging said other toothed rim, an angularly shaped lever rigidly connected to said toothed segment and a link connecting said lever to the leg.

In testimony whereof I have signed my name.

FRITZ ALBERT NILSSON.